Nov. 9, 1954
D. H. NORTON ET AL
2,693,662
FLY HOLDER
Filed June 26, 1951
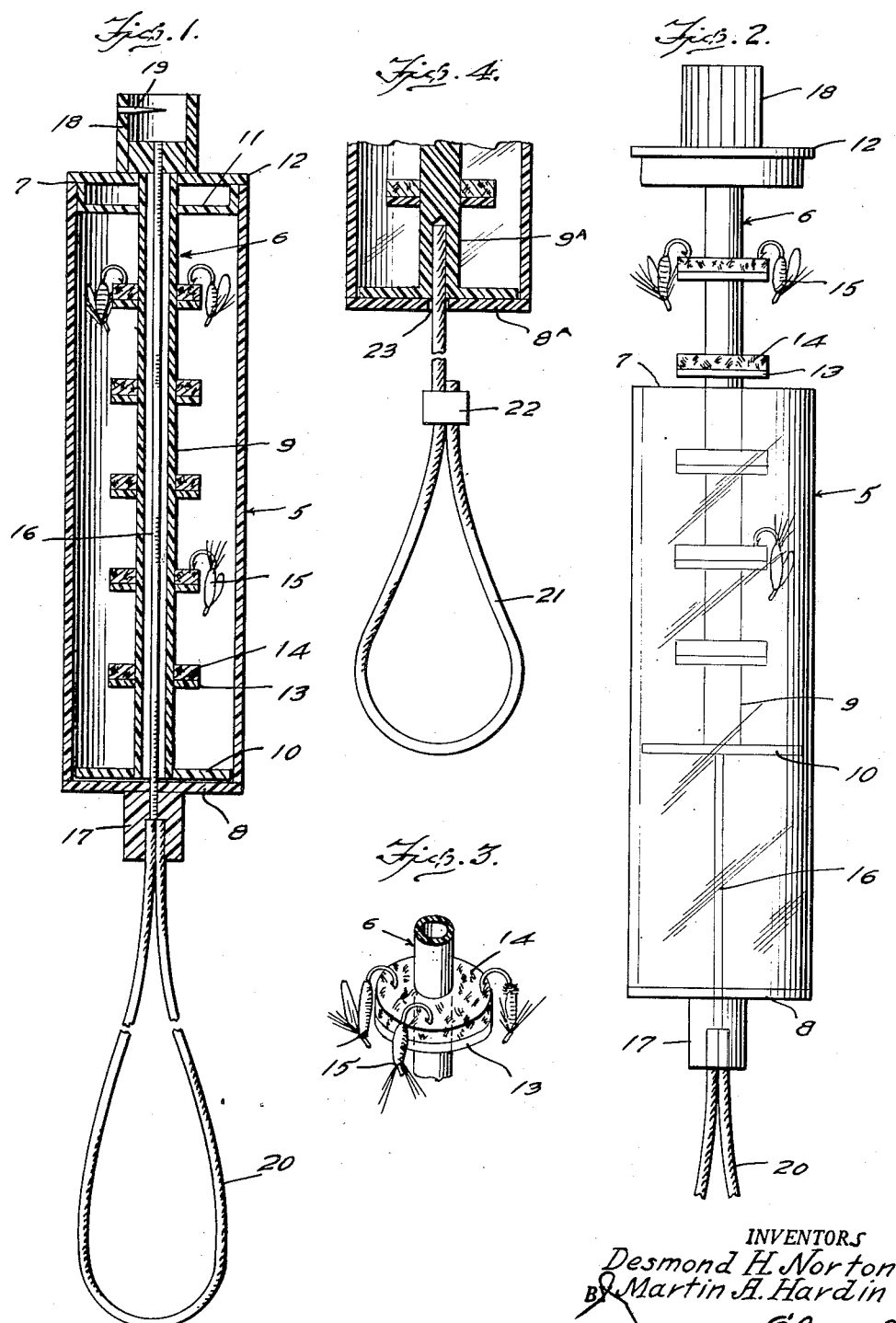
INVENTORS
Desmond H. Norton
Martin A. Hardin
BY
O'Connell
ATTORNEYS United States Patent Office 2,693,662
Patented Nov. 9, 1954

2,693,662

FLY HOLDER

Desmond H. Norton and Martin A. Hardin, Ogden, Utah

Application June 26, 1951, Serial No. 233,560

2 Claims. (Cl. 43—57.5)

This invention relates to a container-holder structure for artificial flies and the primary object of the invention is to provide a new and novel structure for the purpose mentioned possessing many advantages over such device as now known and used by many fishermen employing artificial flies for fishing.

One of the specific objects of the invention is to provide a container-holder structure for artificial flies which, while comparatively small in size, has a capacity for a large number of artificial flies.

Still another object of the invention is to provide a container-holder structure for artificial flies embodying a combination and arrangement of parts whereby the artificial flies are always clearly in view while disposed within the container, and the user has no other alternative than to arrange the flies in a neat and orderly manner to facilitate selection and removal of a selected fly from the device.

Still another specific object of the invention is to provide a device of the character above mentioned whereby the removal of a selected fly is so facilitated that the likelihood of dislodging other flies is reduced to a minimum and consequently the loss of flies, a source of aggravation and delay to the fisherman, and which is likely to occur if a stiff breeze is blowing, is practically entirely eliminated.

Still another object of the invention is to provide a device of the character above mentioned so equipped that it may be conveniently attached to the garment of the user without interfering with the desired use of the device and at the same time reducing the possibility of the device becoming lost or misplaced.

The invention together with its objects and advantages will be best understood and appreciated when the following detail description thereof is read with reference to the accompanying drawings wherein are illustrated what are presently considered the preferred embodiments of the invention and in which:

Figure 1 is a longitudinal sectional view through the fly holder embodying the features of this invention, and with the device illustrated in fully closed condition.

Figure 2 is an elevational view of the device but with the same shown in a partially open condition.

Figure 3 is a fragmentary perspective view of a portion of the holder structure of the device and showing the manner in which the flies are normally carried by the holder part of the device, and Figure 4 is a fragmentary detail longitudinal sectional view illustrating a slightly modified form of the invention.

Referring now more in detail to the drawing, it will be seen that the fly holder of this invention comprises, in general, a casing 5 and a fly holder or rack indicated generally by the reference numeral 6 and having a working sliding fit within the casing 5.

Preferably the casing 5 is tubular in form, having an open end 7 and a closed end 8. Also the casing 5 is formed of a suitable transparent material, preferably transparent plastic so that the contents of the casing are at all times viewable.

The fly holder or rack 6 is also formed preferably, of transparent plastic and comprises a rod or shaft 9 that is preferably hollow and open at its respective opposite ends, a guide disc 10 at one end of the shaft and of a diameter slightly less than the interior diameter of the casing 5 so as to have a working sliding fit within the casing, a hollow closure disc 11 at the opposite end of the shaft and provided with a peripheral flange 12; the disc 11 being of a diameter to fit snugly within the casing 5 with the flange 12 abutting the wall of the casing at the end of 7 thereof to provide an efficient closure for the casing 5.

Intermediate the discs 10 and 11 the shaft 9 of the holder or rack is provided at intervals with discs 13 materially smaller in diameter than either of the discs 10 and 11. The discs 13 are faced or surfaced with penetrable material 14, preferably cork.

The artificial flies or hooks 15 are detachably connected to the surfaced discs 13 by embedding the pointed ends of the hooks in the surface material 14, as shown to advantage in Figure 3. In this connection it will be noted that the diameters of the discs 13 relative to the diameter of the casing 5 are such to provide sufficient clearance so that the flies 15 are accommodated in the space between the peripheral edges of the discs 13 and the peripheral wall of the casing 5, thus permitting relative sliding movement of the casing 5 and holder or rack 6 without likelihood of displacing or otherwise disturbing the flies 15.

In the form of the invention shown in Figures 1 and 2, the holder or rack 16 is normally releasably held retracted or within the casing 5 through the medium of a length of elastic cord or the like 16 that extends axially through the rod or shaft 9 of the holder and at one end is anchored at the closed end 8 of casing 5 by being embedded or otherwise secured within the material of a boss 17 formed on the casing 5 at the end 8, exteriorly of the casing, and having its other end similarly secured to a combination manipulating knob and cup 18 suitably provided at the disc end 11 of the rack 6 as by being formed integrally or otherwise therewith.

As is well-known in the art, new artificial flies sometimes have the eyes of the hooks thereof filled with lacquer and therefore cleaning of the eye hooks is necessary to permit proper use of the flies. To facilitate such cleaning the device of this invention is characterized by the aforementioned combination knob and cup 18 which latter is provided with an eye cleaning member 19 in the form of a pointed shank extending radially inwardly from the peripheral wall 18, as shown to advantage in Figure 1. The manner of using the cup 18 and cleaning member 19 for clearing or cleaning the eyes of the flies or hooks 15 is believed to be too apparent to require extended explanation.

From the description of the invention thus far, it is apparent that the holder or rack 6 may be pulled outwardly from the casing 5 to, for example, the position shown in Figure 2, against the tension of the elastic member 16 for the purpose of attaching or detaching a fly 15 from the selected disc 13. The rack or holder 16 may be conveniently pulled outwardly through the open end 7 of the casing 5 by the operator holding the casing 5 in one hand and grasping the knob 18 of the rack 6 with the other hand exerting a pull on the knob. When the detaching or attaching operation has been completed the pull on the rack is released or lessened permitting the rack 9 to move in response to the contracting action of the member 16, inwardly of the casing 5. With the rack 6 in final position within the casing 5, the disc 11 thereof forms an efficient closure for the open end 7 of the casing 5.

The device of this invention is further characterized by being provided with a loop 20 formed from a single length of cord or other suitable material having the ends thereof suitably embedded or otherwise secured in the material of the boss 17 at the closed end 8 of the casing 5. Obviously the loop 20 will accommodate the wrist of the user or the belt of the user and thus provides a means whereby the device may be carried in a convenient manner and in a manner to overcome the possibility of misplacing or losing the holder. Obviously, when the loop 20 is engaged with the belt of a garment of the wearer the casing 5 and associated parts may be conveniently carried in the pocket of the user's garment.

An alternate form of keeper-loop and manner of securing the same to the device is shown in Figure 4. As therein shown, the loop is indicated generally by the reference numeral 21 and is formed from a single length of material, one end of which is turned back upon its end secured as at 22 to form the loop proper while the other end is embedded in the material of the rack or holder post, indicated in this figure, by the numeral 9A and therein illustrated as being solid. In order to accommodate the end of the loop attached to the rod 9A the closed end 8A of the casing is provided with an aperture 23.

From the foregoing description, taken in connection with the accompanying drawings, the construction and operation of the invention will be readily understood without requiring a more extended explanation. It should be sufficient, in this connection, to observe that the casing 5 being fabricated from transparent material, the selection of the fly desired is facilitated. The fisherman is able, as it were, to pinpoint the fly he desires very rapidly and without the necessity of rummaging through a tangled conglomeration of assorted flies as is now generally the case. With this device, when the fisherman has in mind the fly he desires he may either slide the casing 5 relative to the rack or pull the rack 6 outwardly relative to the casing 5 as may be found desirable, make his selection, remove the selected fly easily, after which the parts are quickly and easily returned to the normal position shown in Figure 1.

While specific forms of the invention have been described and illustrated herein, it will be understood that the same may be varied without departing from the spirit of the invention or the scope of the claims hereto appended.

We claim:

1. An artificial fly container comprising a tubular transparent casing closed at one end and open at the other end, a fly rack coextensive with the casing and composed of a central hollow shaft having at one end a disc dimensioned to enter the casing snugly and having at the other end a closure member to close the open end of the casing when the rack is fully within the latter, the shaft being provided with uniformly spaced fly seats, and an elastic member anchored at one terminal to the closed end of the casing at the center of the latter and at the other end to a central point on the casing closure, said member extending through said shaft so as to yieldingly retain the closure in place and the fly rack in enclosed position by the casing.

2. An artificial fly container comprising a tubular transparent casing closed at one end and open at the other end, a fly rack composed of a central hollow shaft having at one end a disc dimensioned to enter the casing snugly and having at the other end a hollow closure disc to close the open end of the casing when the rack is fully within the latter, the latter being provided with a peripheral flange against which the end wall of said casing abuts, the shaft being provided with uniformly spaced fly seats, and an elastic member anchored at one terminal to the closed end of the casing at the center of the latter and at the other end to a central point on the casing closure, said member extending through said shaft so as to yieldingly retain the closure in place and the fly rack in enclosed position by the casing.

References Cited in the file of this patent

UNITED STATES PATENTS

| Number | Name | Date |
|---|---|---|
| 460,244 | Wills | Sept. 9, 1891 |
| 1,624,233 | Griffin | Apr. 12, 1927 |
| 1,888,304 | Bekeart | Nov. 22, 1932 |
| 1,954,127 | Harsted | Apr. 10, 1934 |
| 2,225,309 | Lawrence | Dec. 17, 1940 |
| 2,367,019 | Haag | Jan. 9, 1945 |
| 2,499,042 | Vogel | Feb. 28, 1950 |
| 2,525,057 | Anderson | Oct. 10, 1950 |
| 2,578,424 | Hart | Dec. 11, 1951 |

FOREIGN PATENTS

| Number | Country | Date |
|---|---|---|
| 393,432 | France | Dec. 22, 1908 |